Sept. 7, 1954  E. C. BERGQUIST  2,688,481
AXLE SUSPENSION
Filed Aug. 22, 1952  2 Sheets-Sheet 1

INVENTOR.
Ernest C. Bergquist
BY
O. B. Garner
Atty.

Sept. 7, 1954  E. C. BERGQUIST  2,688,481
AXLE SUSPENSION
Filed Aug. 22, 1952  2 Sheets-Sheet 2

INVENTOR.
Ernest C. Bergquist
BY
O. B. Garner
Atty.

Patented Sept. 7, 1954

2,688,481

UNITED STATES PATENT OFFICE 2,688,481

AXLE SUSPENSION

Ernest C. Bergquist, Chicago, Ill., assignor to American Steel Foundries, Chicago, Ill., a corporation of New Jersey Application August 22, 1952, Serial No. 305,794

6 Claims. (Cl. 267—58)

My invention relates to an axle assembly utilizing a coiled spring to resiliently support a related vehicle body.

My invention comprehends a new and improved housing and suspension device for use with a "trail-type" axle assembly such as that disclosed in the copending application, Serial No. 281,959, filed April 12, 1952, which has issued as Patent No. 2,659,596, granted November 17, 1953 in the name of Harold C. Keysor. Referring to said application, it will be seen that a "trail-type" axle assembly is one wherein a main shaft eccentrically carries a rotatable vehicle supporting wheel in such a manner that the axis of rotation of the wheel is spaced from and parallel to the longitudinal axis of the main shaft.

It is a general object of my invention to provide a novel trail-type axle suspension of compact design.

A further object of the invention is the utilization of a square or rectangular cross section helical spring in said suspension device, whereby maximum spring strength is available in a minimum volume.

It is another object of my invention to provide a suspension device of the character described wherein provision is made to preset or adjust the tension under which said helical spring operates, thereby achieving consistent tension on all the supporting wheels of the vehicle.

It is a more specific object of my invention to provide a novel mounting housing for said suspension device.

Other objects of my invention will become apparent in the course of the following description and from an examination of the drawings, wherein:

Figures 4 and 5 are perspective views of the end cap and spring clip, respectively, employed in my novel device.

Figure 1:
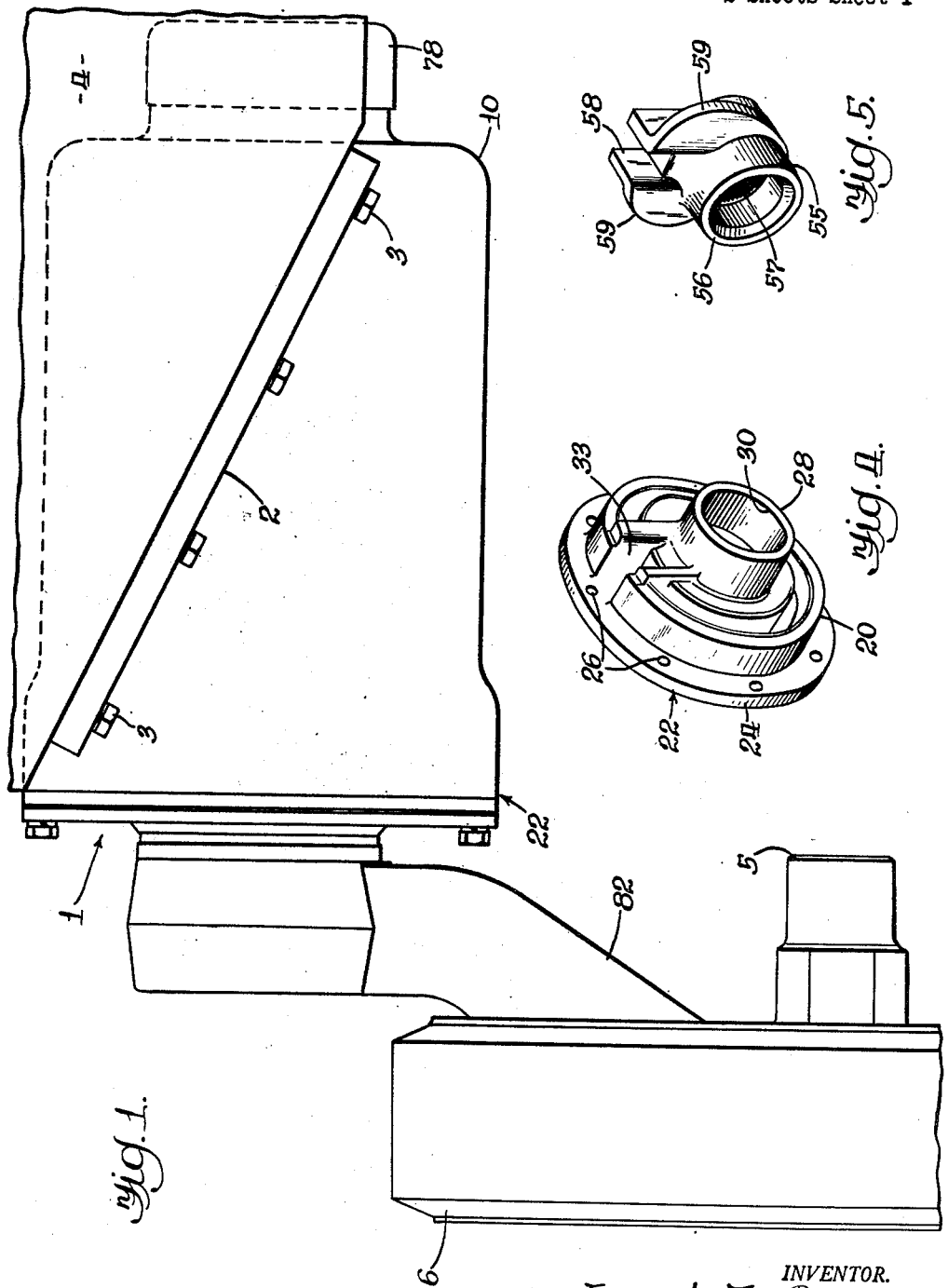
Figure 1 is a side elevational view showing my device assembled to one wheel of the supported vehicle.

Describing the invention in detail and referring to Figure 1, it will be seen that my novel suspension device indicated generally at 1, is provided with wings 2 on each side thereof for mounting in any suitable manner such as by the bolts 3 to the underside of a hull or vehicle body 4. An axle 5 providing rotatable mounting for a vehicle supporting wheel 6 is eccentrically carried by said device in such a manner that the axle 5 is spaced horizontally from, that is trailing, the longitudinal vertical plane passing through the center of said suspension device. I have illustrated only one point of suspension, it being understood that the vehicle 4 may be equipped with as many suspension points as required.

Figure 2:
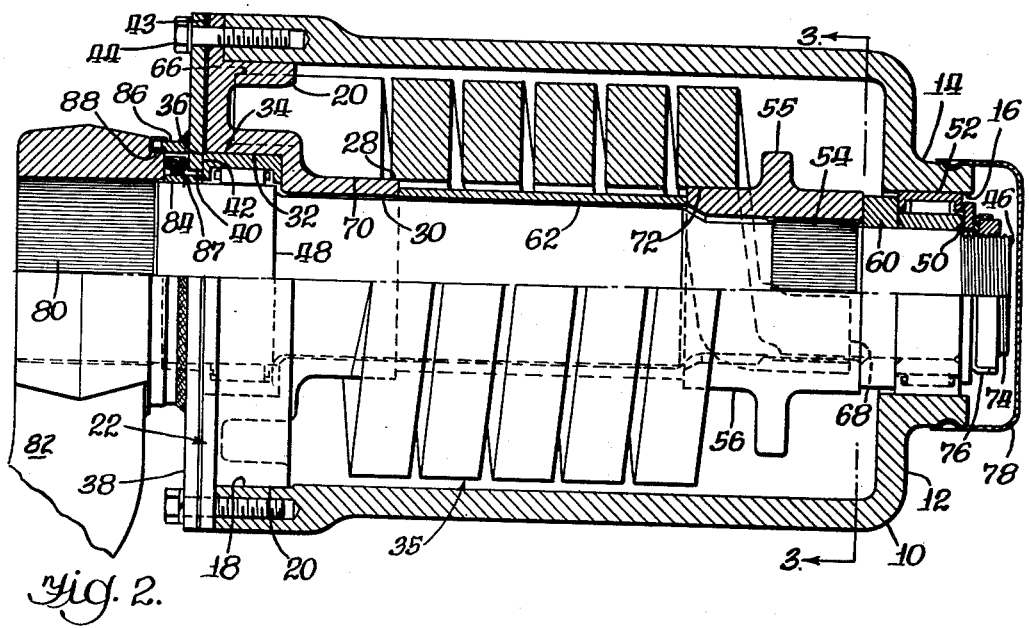
Figure 2 is a side sectional view, partly in elevation, of my novel suspension device.
Figure 3:
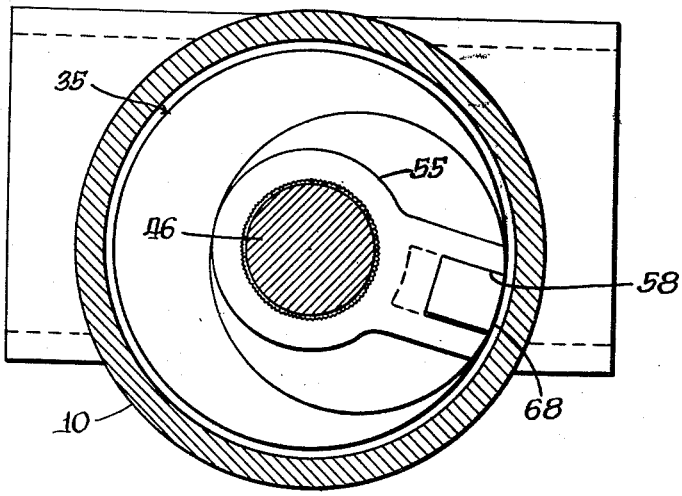
Figure 3 is a sectional view along lines 3—3 of Figure 2.

Referring to Figure 2, the novel device comprises a hollow housing 10, preferably a casting such as cast steel or cast iron, of generally circular form in cross section and having at one end thereof an end wall 12 centrally presenting thereon an extended circular flange 14 defining an opening 16. The opposite end of the housing 10 is open and is preferably machined as at 18 to provide a close tolerance fit for the registering flange 20 of an end cap 22.

Referring now to Figure 4, the perspective view of the end cap, it will be seen that said cap comprises an arcuate mounting flange 24 having a plurality of mounting holes 26 radially disposed adjacent the outer periphery thereof. Centrally of said end cap a barrel-like projection 28 defines a shaft receiving bore 30 and a bearing receiving counter bore 32 (Figure 2). It will also be noted that the registering flange 20 is interrupted to present the radially disposed slot 33 which receives one end of the torsion spring 35 as hereinafter described.

The end cap 22 is mounted on the open end of the housing 10. Bearing means 34 are disposed within the counter bore 32. It will be seen that the bearing means 34 comprises an outer bearing race 36 tightly fitted into the counter bore 32 and projecting slightly above the outer surface of the end cap 10. A plurality of circumferentially disposed needles are captive within peripherally extended lugs on the inside diameter of said outer race. A bearing retainer plate 38 having a plurality of radially spaced holes registrable with the mounting holes 26 of the end cap 22 is positioned adjacent the outboard face of said end cap with the edge of a centrally located clearance hole 40 in flat abutting engagement with the projecting edge of the bearing race 36 as at 42. A plurality of studs 44 disposed within the mounting holes of the retainer plates and end cap serve to tightly clamp said plate and cap into position on the end of the housing 10. A spacer-seal 43 is disposed between the end cap and the retainer plate peripherally along the outboard edges of said parts.

Centrally disposed within the housing 10 and extending from the ends thereof is the main shaft 46. Adjacent the open end of said housing the shaft presents an enlarged portion 48 which is preferably ground to provide a smooth race surface to engage the needles of the bearing means 34. Adjacent the opposite end of the housing 10 the main shaft has tightly fitted thereon an inner bearing race 50. The end opening 16 of the housing 10 tightly receives an outer bearing race 52 having captive therein a plurality of needles disposed peripherally along its inside diameter and between radially extending lugs to engage the inner race 50 and thus provide bearing means acting in concert with the bearing means 34 to accommodate rotary movement of the main shaft 46.

It will be noted that the main shaft 46 presents at a point adjacent and inboardly of the end opening 16 of the housing 10 a male splined portion 54. As seen in Figure 5 the spring clip 55 comprises a hollow open end cylinder 56 having a female spline 57 formed on its inside diameter and eccentrically formed outwardly extending flanges 59 which define a spring receiving slot 58 disposed radially and longitudinally of the cylinder 56. The spring clip 55 is positioned over the main shaft 46 with its spline 57 complementally engaging the spline 54 of said shaft. A spacer 60 is disposed on the shaft intermediate and respectively engaging the inner race 50 and the spring clip 54.

Another sleeve or spacer 62 is disposed over the central portion of the main shaft and abuts at its opposite ends the inboard edge of the spring clip 54 and the inboard edge of the end cap 22, thus maintaining the clip in proper position longitudinally of the shaft.

Figure 6:
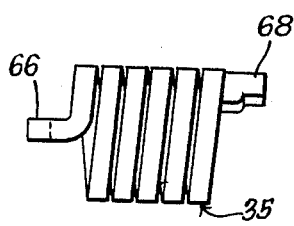
Figures 6 and 7 are detailed views of the torsion spring utilized in my novel device.
Figure 7:
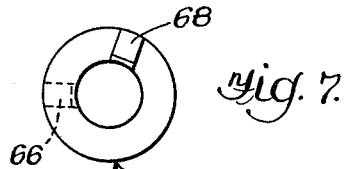

Referring now to Figures 6 and 7, it will be seen that the torsion spring 35 employed in my novel suspension device is preferably a coil spring of rectangular cross section. Opposite ends 66 and 68, respectively, of the spring are formed to extend longitudinally thereof and, as seen in Figure 6, the spring ends are formed at an angular space of approximately 120°. It will be noted that the rectangular cross section torsion spring provides a spring of maximum strength for a given occupied volume.

The torsion spring 35 is sleeved over the main shaft 46 within the housing 10. The end 66 of the spring is snugly fitted within the slot 33 within the end cap and the end 68 of the spring is snugly fitted within the slot 58 of the spring clip 55. It will be noted that the inside diameter of the spring coil adjacent the end cap is seated in flat face engagement on the underside diameter of the projection 28 as at 70 and the inside diameter of the spring coil adjacent the spring clip is seated in flat face engagement on the outside diameter of the cylinder 56 as at 72. The flat face engagement of the coils at the respective ends of the spring provides solid fulcrum points whereby a bending stress is induced into the spring under the action of the device as hereinafter described.

Adjacent the opening 16 of the housing 10 the main shaft presents a threaded portion 74. A retainer plate is positioned over the threaded portion 74 to abut the bearing races 50 and 52. A standard lock washer-lock nut arrangement 76 is positioned on the threaded portion 74 and maintains alignment in the entire device. A cap 78 is positioned on the housing 10 closing the opening 16 and thus sealing the suspension device.

At the opposite end of the housing 10 the main shaft extends externally thereof and presents a splined end portion 80 which is received by a complementary splined hole in one end of the crank arm 82. It should be noted that any suitable means may be utilized to retain the crank arm on the shaft, however, in the preferred embodiment the crank arm is heated and shrunk into position on the shaft. A spacer 84 is disposed on the shaft between the crank arm 82 and the bearing means 34. A circular ledge 86 is secured to the retainer plate 38 between said plate and the crank arm and a flexible guard or gasket 88 is there positioned to seal the opening between the ledge 86 and the arm 82. A conventional grease seal is provided at 87 to maintain lubricant within the bearing.

In operation, the weight of the vehicle or the action of the wheels when the vehicle is in motion urge the wheel 6 to move arcuately about the axis of the main shaft 46 rotating the shaft and the fixedly connected spring clip 54 and the spring end connected thereto. The other end of the spring being fixed to the housing resists rotation. Hence rotation of the shaft 46 induces a bending stress into the torsion spring 64 and the induced stress flexibly resists rotation of the main shaft and consequently flexibly supports the carried vehicle body.

It will be noted that the splined connection between the spring clip 54 and the main shaft provides adjustable means whereby the angular variation in the position of the spring ends 66 and 68 may be accommodated. In addition, the relative angular position of the crank arm 82 may also be changed by disassembling the crank arm and reassembling in a changed spline engaging position. Thus it is seen that the relative position of the shaft, the spring and the crank arm may be varied to increase or decrease the stress under which the spring acts, and since it is practically impossible to manufacture springs of exact physical characteristics, my structure offers means to obtain substantially equal resiliency at all points of vehicle suspension.

I claim:

1. In an axle assembly of the type described, a housing, a shaft supported thereby, a helical spring of rectangular cross section surrounding said shaft, straight portions on the respective ends of said spring extending substantially parallel to said surrounded shaft, a spring clip splined to said shaft and having a slot receiving one of said straight portions, a cap secured to one end of said housing and having a slot receiving the other of said straight portions, a coil of said spring adjacent the spring clip having its inside diameter in arcuate surfaced engagement with said clip and a coil of said spring adjacent the cap having its inside diameter in surface engagement with said cap.

2. An axle assembly of the type described according to claim 1, wherein the straight end portions of said spring are formed at an angular separation of approximately 120°.

3. In an axle assembly of the type described, the combination with the main shaft eccentrically carrying a supporting wheel; of a cylindrical housing surrounding said shaft, bearing means at opposite ends of the housing rotatably supporting said shaft, an end cap at one end of the housing having an aperture receiving said main shaft, a housing sealing cap at the other end of the housing, a helical spring comprising a plurality of coils of rectangular cross section surrounding said main shaft and disposed within the housing, straight end portions on the spring substantially paralleling the axis of the main shaft, a spring clip disposed adjacent the other end of the housing and having a splined connection to said shaft, slots in the end cap and clip each receiving the adjacent straight end portion of the spring, and areas of arcuate surfaced engagement between the end cap and clip and the respective first adjacent coils of the spring.

4. An axle assembly according to claim 3, and including a spacer surrounding said shaft and disposed intermediate and engaging the clip and end cap.

5. An axle assembly according to claim 4, wherein said bearing means consists of roller bearings, and the bearing adjacent the other end of the housing is positioned on the shaft inboardly of the clip.

6. An axle assembly according to claim 3, wherein said end cap is demountably secured to the housing.

References Cited in the file of this patent

UNITED STATES PATENTS

| Number | Name | Date |
|---|---|---|
| 298,016 | Moore | May 6, 1884 |
| 1,091,884 | Griffin et al. | Mar. 31, 1914 |
| 1,956,877 | Prouty et al. | May 1, 1934 |
| 1,970,823 | Suczek | Aug. 21, 1934 |
| 2,542,261 | Probst | Feb. 20, 1951 |

FOREIGN PATENTS

| Number | Country | Date |
|---|---|---|
| 116,051 | Switzerland | Oct. 16, 1926 |
| 469,306 | Great Britain | July 22, 1937 |
| 772,052 | France | Aug. 6, 1934 |